United States Patent [19]

Engelson et al.

[11] Patent Number: 4,559,588

[45] Date of Patent: Dec. 17, 1985

[54] PENLITE AND METHOD OF ASSEMBLING THE SAME

[76] Inventors: Steven N. Engelson, P.O. Box 2651, Walnut Creek, Calif. 94553; John McAnallan, 228 Sausalito St., Corte Madera, Calif. 94925

[21] Appl. No.: 567,902

[22] Filed: Jan. 3, 1984

[51] Int. Cl.[4] .................................................. B62J 5/00

[52] U.S. Cl. .................................... 362/196; 362/189; 362/202; 362/205; 362/206; 362/295; 200/60

[58] Field of Search ............... 362/196, 189, 202, 205, 362/206, 295; 200/60

[56] References Cited

U.S. PATENT DOCUMENTS 3,359,411 12/1967 Schwartz ............................ 362/196

*Primary Examiner*—Stephen J. Lechert, Jr.
*Attorney, Agent, or Firm*—Rankin A. Milliken

[57] ABSTRACT

A penlite the body of which is made from two reinforced plastic half-bodies which are joined along one common edge by an integral web hinge.

7 Claims, 10 Drawing Figures

PENLITE AND METHOD OF ASSEMBLING THE SAME

BACKGROUND OF THE INVENTION

1. Field of the Invention

The present invention relates to flashlights, and more particularly to disposable penlites and methods of assembling the same.

2. Description of the Prior Art (The term "prior art" as used herein or in any statement made by or on behalf of applicants means *only* that any document or thing referred to as prior art bears, directly or inferentially, a date which is earlier than the effective filing data hereof.)

Penlites are in general well-known in the prior art. More particularly, penlites provided with pocket clips which also function as switch operating members are well-known in the prior art. Further, penlites which incorporate incandescent lamps having integral light beam focusing lenses are well-known in the prior art. However, the parts counts of prior art penlites have in general been greater than optimum, and thus the parts costs thereof have been greater than necessary, and the assembly costs thereof have been greater than necessary.

Further, certain parts of some prior art penlites have been of relatively complex configuration, and have sometimes required to be interfitted by relatively complex manipulations, thus further adding to the cost of production of these prior art penlites.

SUMMARY OF THE INVENTION

Accordingly, it is an object of the present invention to provide penlites having minimum parts counts.

Another object of the present invention is to provide penlites in which the switch parts are of extremely simple configuration, and are assembled to the bodies thereof in an extremely simple and efficient manner.

Yet another object of the present invention is to provide methods of assembling penlites which minimize the cost of such assembly.

A further object of the present invention is to provide penlites which are particularly adapted to being made and sold as disposable penlites.

Other objects of the present invention will in part be obvious and will in part appear hereinafter.

The present invention, accordingly, comprises the apparatus embodying features of construction, combinations of elements, and arrangements of parts exemplified in the following disclosure, and the methods of assembling the same comprising the several fabrication and assembly steps and the relation of one or more of such steps to each of the others, all as exemplified in the following disclosure, and the scope of the present invention will be indicated in the claims appended hereto.

In accordance with a principal feature of the present invention the body of a penlite comprises two semicylindrical half-body portions which are hingedly joined together by a common web hinge member along one common edge, thereby making it possible to form the battery and bulb locating members integrally with the penlite body, from the same material and in the same molding operation.

In accordance with another principal feature of the present invention said two half-body portions and said web hinge members are parts of a single molded body member.

In accordance with yet another principal feature of the present invention said molded body member is molded from a reinforced plastic material the bulk properties of which are such that said half-body portions can be brought from side-by-side juxtaposition to mutually confronting juxtaposition at least several times without rupturing said web hinge member, but at the same time the assembled penlite body is as rigid as the bodies of penlites in general, and sufficiently rigid to avoid damage to internal parts of the penlite, and to avoid closing of the penlite switch by inadvertent deforming of the body thereof.

In accordance with an additional principal feature of the present invention said molded body member is molded with said half-body portions in side-by-side relation.

In accordance with another principal feature of the present invention a penlite of the present invention is assembled by positioning the inner parts thereof in one of the half-body portions thereof, bringing the half-body portions thereof into mutually confronting relation, and locking the half-body portions together by means of locking end caps.

In accordance with yet another principal feature of the present invention a penlite of the present invention may consist of as few as five parts in addition to the incandescent lamp and batteries.

In accordance with a further principal feature of the present invention the pocket clip of the penlite of the present invention is integral with the body thereof and molded at the same time, in the same mold, from the same body of reinforced plastic material.

For a fuller understanding of the nature and objects of the present invention, reference should be had to the following detailed description, taken in connection with the accompanying drawings.

DESCRIPTION OF THE PREFERRED EMBODIMENT

Figure 1:
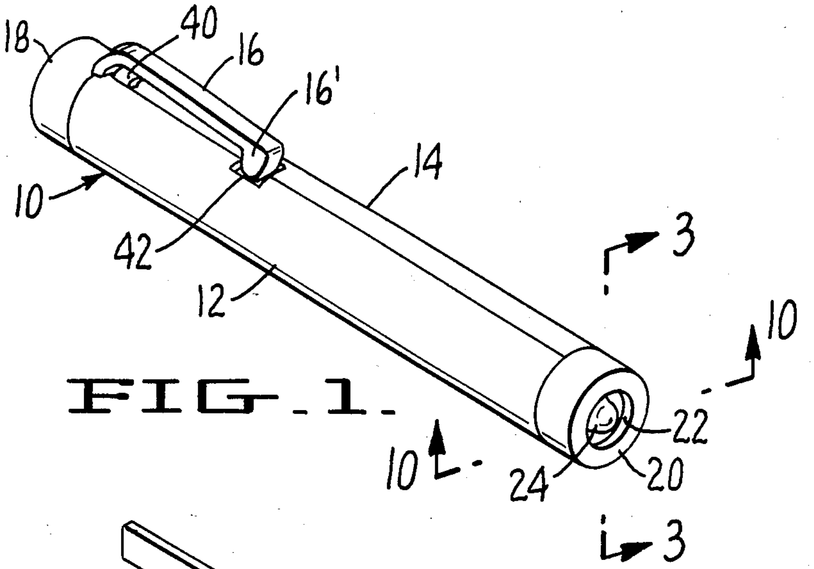
FIG. 1 is a perspective view of a penlite of the present invention.

Referring now to FIG. 1, there is shown a penlite 10 constructed in accordance with the principles of the present invention. As seen in FIG. 1, penlite 10 comprises two half-body portions 12, 14, a pocket clip 16, and two end caps 18, 20. As also seen in FIG. 1, lower end cap 20 is provided with an aperture 22 through which passes the light emitted by incandescent lamp 24, which is of the type having a light beam focusing lens integral with its glass bulb.

Figure 2:
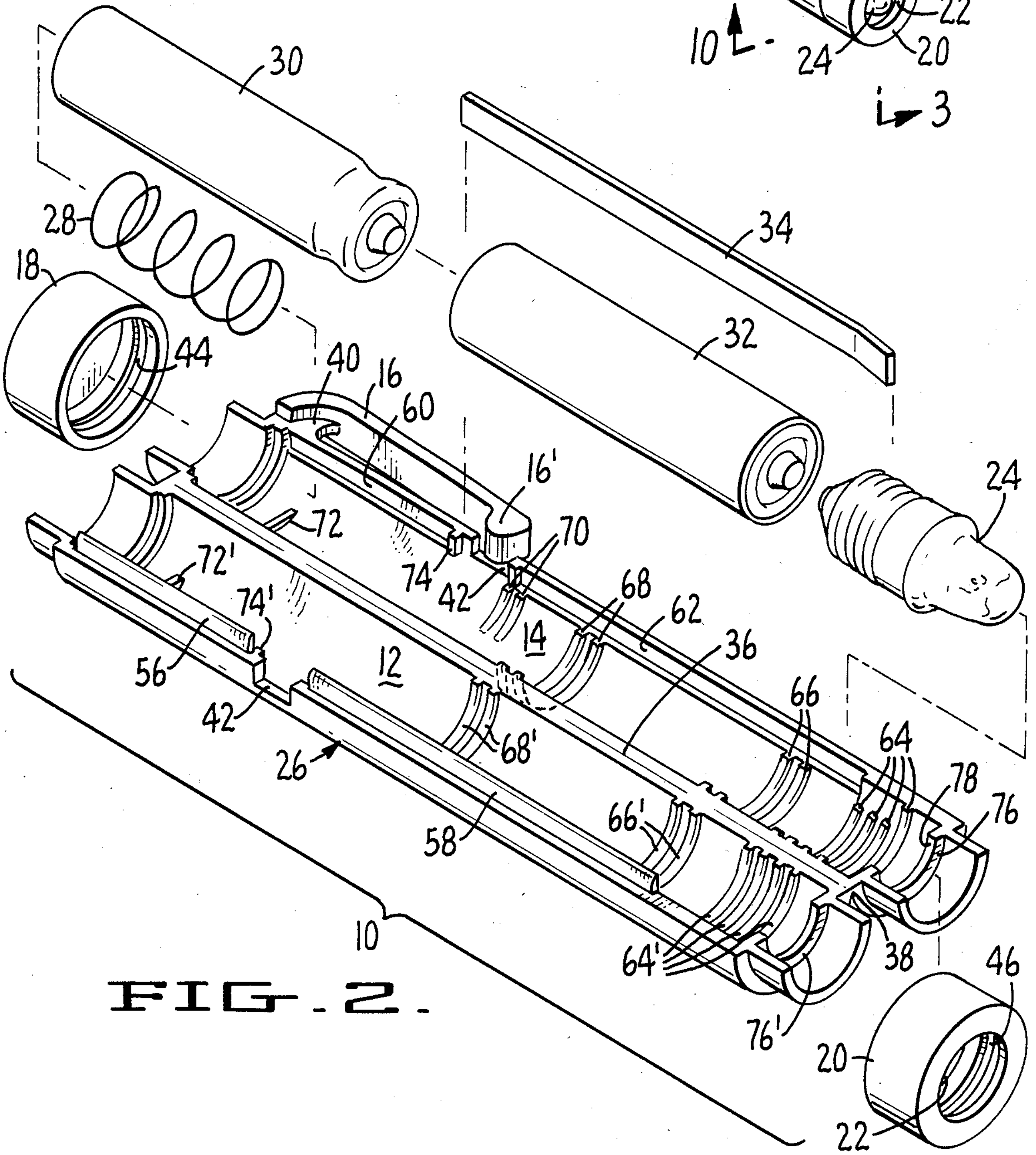
FIG. 2 is an exploded perspective view of the penlite of FIG. 1.

Referring now to FIG. 2, it will be seen that penlite 10 consists of a body member 26, end caps 18, 20, a coil spring 28, batteries 30, 32, incandescent lamp 24, and a contact leaf spring 34.

As also seen in FIG. 2, body member 26 comprises half-body portions or half-bodies 12 and 14, which are joined along a common edge 36 by a narrow web 38 which serves as a hinge to hingedly join half-bodies 12 and 14 for relative pivoting about common edge 36.

Half-bodies 12 and 14 are shown in side-by-side juxtaposition in FIG. 2, and may be hingedly pivoted about common edge 36 to bring them into the mutually confronting juxtaposition shown in FIGS. 1 and 3 through 10.

In accordance with the principles of the present invention body member 26, including hinge web 38, is molded as a single piece from a suitable reinforced plastic material the bulk properties of which are such that while penlite 10 is suitably rigid, web hinge 38 can be flexed between the half-bodies side-by-side juxtaposition and the half-bodies mutually confronting juxtaposition at least several times without rupturing hinge web 38.

A suitable reinforced plastic material for body member 26 is fiberglass reinforced polypropylene, in which the fiberglass is powdered or fibrous, and constitutes about 30% by volume of the reinforced plastic material.

In accordance with the principles of the present invention, body member 26 and end caps 18 and 20 are preferably molded simultaneously in a single "family" mold, in which body member 26 is molded in half-bodies side-by-side juxtaposition, as shown in FIG. 2.

Further, in accordance with the present invention, pocket clip 16 is integral with and molded at the same time as body member 26. Also, in accordance with the present invention, pocket clip 16 is reinforced by means of an integral web 40, as particularly shown in FIG. 2.

It is to be noted that, contrary to the expectations of those having ordinary skill in the art, the use of a suitable plastic molding material, such as the fiberglass-polypropylene material described above, makes it possible to impart (a) sufficient rigidity to body member 26, (b) sufficient flexure resistance to hinge web 38, and (c) sufficient strength to pocket clip 16, despite the fact that these elements of the penlite of the invention are all molded from the same body of reinforced plastic material.

It is also to be noted that the aperture 42 for the switch operating end 16' of pocket clip 16 is formed at the time of molding body member 26.

As further seen in FIG. 2, battery 30 is uninsulated, i.e., is not provided with an outer cylindrical covering of insulating material in the well-known manner; whereas battery 32 is thus insulated.

As seen in FIG. 2, end cap 18 is provided with a channel or groove 44 on the inner surface of its cylindrical outer portion, and end cap 20 is provided with a similar channel or groove 46 on the inner face of its cylindrical outer portion.

Figures 3, 4, 5, 6, 7, 8, 9, 10:
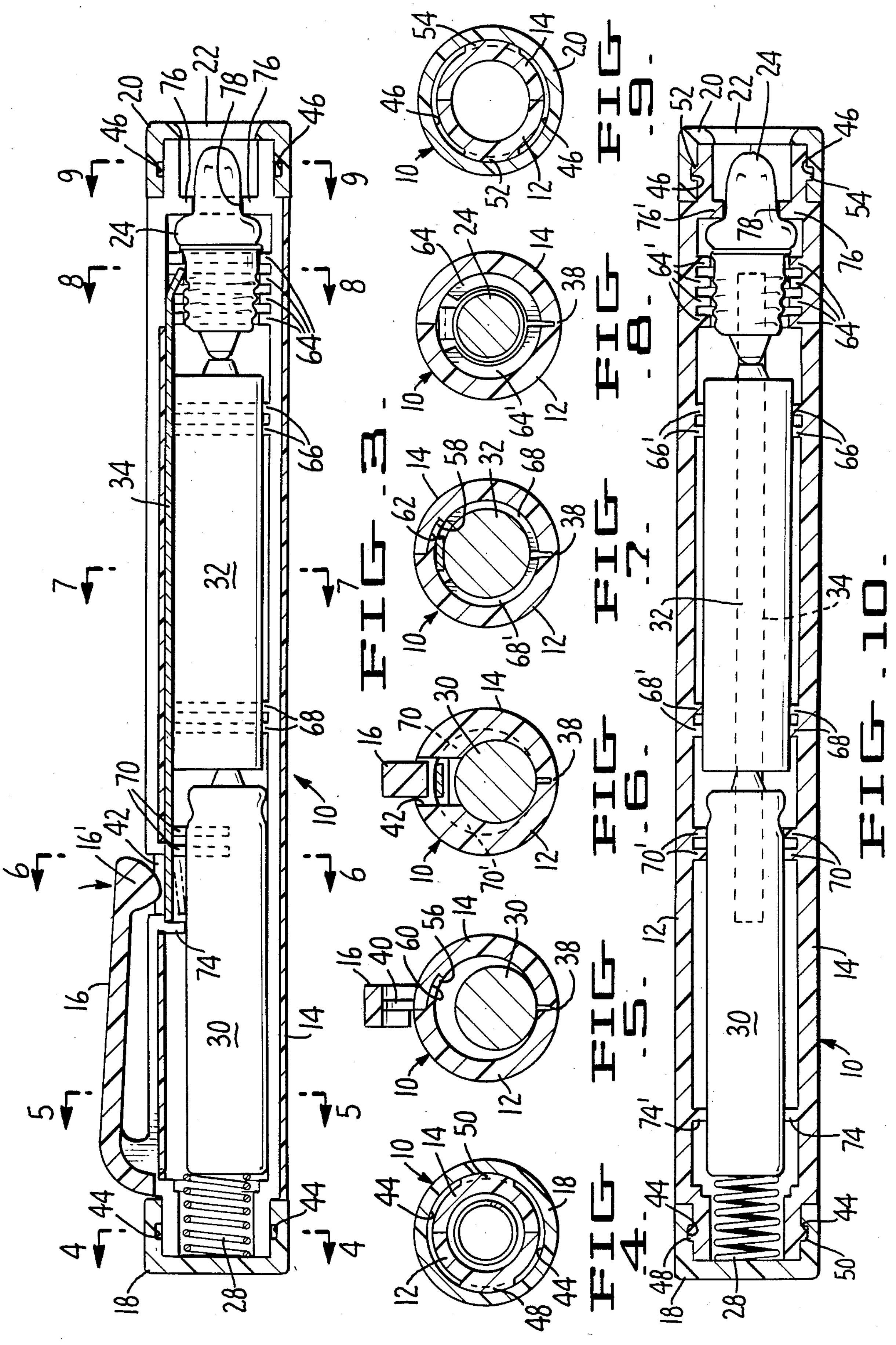
FIG. 3 is a sectional view of the penlite of FIG. 1, taken on plane 3—3 of FIG. 1.
FIGS. 4 through 9 are sectional views of the penlite of FIG. 3, taken on planes 4 through 9 of FIG. 3, respectively.
FIG. 10 is a sectional view of the penlite of FIG. 1, taken on plane 10—10 of FIG. 1.

As best seen in FIG. 4, the end of half-body portion 12 nearest clip 16 is provided with an outwardly depending ear 48 which is adapted to lockingly interfit with channel 44, and the end of half-body portion 14 nearest clip 16 is provided with an outwardly depending ear 50 which is adapted to lockingly interfit with channel 44.

Similarly, as seen in FIG. 9, the end of half-body portion 12 remote from clip 16 is provided with an outwardly depending ear 52 which is adapted to lockingly interfit with channel 46, and the end of half-body portion 14 remote from clip 16 is provided with an outwardly depending ear 54 which is adapted to lockingly interfit with channel 46.

As best seen in FIG. 10, the two half-body portions 12, 14 are held together, in the assembled penlite, by end caps 18, 20, which are themselves locked in position embracing the respective ends of the half-body portions 12, 14 by means of the ears 48, 50, 52, 54, which are interlocked with channels 44 and 46. The reinforced plastic material of half-body portions 12, 14 and end caps 18, 20 is selected to have bulk properties such that the respective parts can deform sufficiently to permit the end caps to be forced over the ends of the mutually confrontingly juxtaposed half-body portions. The reinforced plastic material specified hereinabove is suitable for that purpose. The inner edges of the ends of the end caps may be slightly champfered to facilitate the forcing of the end caps over the mated ends of the half-body portions.

Referring again to FIG. 2, it will be seen that half-body portion 12 is provided with flanges 56, 58 which are constructed and arranged to interfit with corresponding recesses 60, 62 in half-body portion 14 when the half-body portions are brought into mutually confronting juxtaposition, as best seen in FIGS. 5 and 7.

As also seen in FIG. 2, the interior surfaces of half-body portions 12, 14 are provided with suitable ribs for maintaining batteries 30, 32 and lamp 24 in operative position. Comparing FIGS. 2 and 3, it will be seen that lamp 24 is positioned by ribs 64, 64'; that battery 32 is positioned by ribs 66, 66' and 68, 68'; that battery 30 is positioned by ribs 70, 70' (FIG. 10) and 72, 72'. It is to be noted that ribs 64, 64' do not extend completely around lamp 24, but rather are terminated short of the outer edges of half-body members 12 and 14, in order to accommodate the forward end of contact leaf spring 34. An additional pair of ribs 74, 74' is also provided to prevent contact leaf 34 from moving rearwardly with respect to insulated battery 32.

As may be seen by comparison of FIGS. 3 and 10, the ribs 64, 64'; 66, 66'; and 68, 68' are so configured as to maintain lamp 24 and insulated battery 32 substantially coaxial with the common axis of half-body portions 12, 14. The ribs 70, 70'; 72, 72'; and 74, 74', however, are so configured as to maintain uninsulated battery 30 remote from switch opening 42, and thus to prevent the closing of the lamp energizing circuit unless the free end 16' of clip 16 is manually thrust deeply into switch opening 42.

As seen in FIG. 3, contact leaf 34 is maintained in its operative position by insulated battery 32, with its outer end cantilevered over uninsulated battery 30. Contact leaf 34 is preferably fabricated from spring brass or the like, and thus will remain out of contact with the case of uninsulated battery 30 unless it is deflected into contact therewith by finger pressure on the free end 16' of pocket clip 16. When contact leaf 34 is thus brought into contact with uninsulated battery 30 the energizing circuit is completed through the filament of lamp 24, and lamp 24 is illuminated.

Lamp 24 is also positioned by the end wall, 76, 76' (FIG. 2) of the penlite body, which defines an opening 78 through which the lens portion of the bulb of incandescent lamp 24 passes.

The construction and arrangement of the parts of penlite 10, as described hereinabove and shown in the present drawings, makes possible a rapid and efficient method of assembly, which method is itself a principal feature of the present invention.

As seen in FIG. 2, penlite 10 can be assembled by carrying out the following few and simple steps.

1. Batteries 30, 32 and lamp 24 are positioned in half-body portion 12 on their associated ribs (see FIG. 3).

2. Contact leaf 34 is positioned between insulated battery 32 and the outer edge of half-body portion 12, with its forward end in contact with the ferrule of lamp 24 and its rearward end closely adjacent to rib 74, as seen in FIG. 3.

3. Half-body portion 14 is hingedly rotated about common edge 36 into mutually confronting juxtaposition with half-body portion 12, and with flanges 56 and 58 fully seated in the corresponding recesses 60 and 62.

4. End cap 20 is passed over the ends of the half-body portions remote from clip 16, until the ears 52, 54 (FIG. 9) lock into channel 46.

5. Coil spring 28 is placed in the opening defined by the ends of half-body portions 12, 14 adjacent clip 16.

6. End cap 18 is passed over the ends of the half-body portions 12, 14 adjacent clip 16 until the ears 48, 50 (FIG. 4) lockinto channel 44, capturing coil spring 28 between end cap 18 and battery 30.

It will thus be seen that the objects set forth above, among those made apparent from the preceding description, are efficiently attained, and since certain changes may be made in the above construction and the above-disclosed method of assembling the penlite without departing from the scope of the present invention, it is intended that all matter contained in the above description or shown in the accompanying drawings shall be interpreted as illustrative only, and not in a limiting sense.

It is also to be understood that the following claims are intended to cover all of the generic and specific features of the present invention, and all statements of the scope of the present invention which, as a matter of language, might be said to fall therebetween.

What is claimed is:

1. A penlite the body of which is comprised of two semi-cylindrical members of molded plastic material joined along a common edge by a web hinge which is integral therewith, said body being provided on its inner surface with a plurality of ribs adapted to maintain two cylindrical batteries and an incandescent lamp in operative alignment when said semi-cylindrical members are locked together in face-to-face relation to form a cylindrical body member.

2. A penlite as claimed in claim 1, further comprising end caps for containing, and thus joining, the ends of said semi-cylindrical members.

3. A penlite as claimed in claim 2 in which said end caps are provided with internal channels adapted to receive ears projecting from said semi-cylindrical members and thus to lock said end caps to said semi-cylindrical members.

4. A penlite as claimed in claim 1, further comprising a pocket clip which is integral with one of said semi-cylindrical members.

5. A penlite as claimed in claim 4 in which the free end of said pocket clip is arranged to be depressed through an opening defined by said semi-cylindrical members and thus to close the switch of said penlite.

6. The method of assembling a penlite comprising the step of molding two semi-cylindrical halves of the body thereof in side-by-side juxtaposition with an integral web hinge joining them, individually positioning the internal parts of the penlite in one of said semi-cylindrical members, and pivoting the other semi-cylindrical member about said hinge to bring said semi-cylindrical members into mutually confronting juxtaposition.

7. The method of assembling a penlite as claimed in claim 6, further comprising the steps of inserting a coil spring into one end of said semi-cylindrical members; and forcing end caps over the opposite ends of said semi-cylindrical members.

* * * * *